Patented June 18, 1935

2,005,700

UNITED STATES PATENT OFFICE 2,005,700

PROCESS OF EXTRACTING SEX HORMONES AND A COMPOUND OF A SEX HORMONE WITH AN ALKALOID

Fritz Johannessohn, Mannheim-Feudenheim, and Erich Rabald, Mannheim, Germany, assignors to Rare Chemicals, Inc., Nepera Park, N. Y., a corporation of New York No Drawing. Application October 14, 1933, Serial No. 693,670. In Germany October 22, 1932

18 Claims. (Cl. 260—131)

The present invention relates to the processes involving the preparation and purification of the follicular sex hormones and the products of such processes.

Considerable difficulty has been encountered in extracting and purifying follicular sex hormones and in preparing them in suitable condition for therapeutic and medicinal purposes.

The follicular sex hormones as extracted from body tissues, such as the follicles and/or as contained in body fluids, such as urine, are mixed with large quantities of impurities from which they can only be separated and purified with considerable difficulty and/or with unsatisfactory yields.

An object of the present invention is to prepare and purify follicular sex hormones, and/or extracts and fluids containing the same, so that they will be suitable for utilization for therapeutic and medicinal purposes, with relatively high yields. Another object of the present invention is to prepare new and useful follicular sex hormone compositions and compounds. Further objects will hereinafter appear.

In accomplishing the above objects, it has been discovered that alkaloids and alkaloid materials, particularly in the form of their bases, possess a pronounced affinity for the follicular sex hormones contained in aqueous extracts and fluids. When agitated for a shorter or longer time, preferably some hours or days those alkaloids, which are difficultly soluble or insoluble in water, have the property of removing, adsorbing and/or precipitating the follicular sex hormones from the aqueous solutions in which they are found.

As a result of such precipitation or adsorption of the follicular hormone from the aqueous solution, the hormone is removed and separated from the other substances in the extract or aqueous fluid, and a new product, compound, combination or composition of the follicular hormone is formed with the alkaloid.

To obtain such compositions, among others the bases of quinine, quinidine, brucine and theobromine may be used to advantage, and small quantities of same in proportion to the liquid are found to be sufficient. However, it is not necessary to add the alkaloid bases as such, they may also be produced by precipitation from alkaloid salts, which may be mixed with the hormone containing fluid, such as urine, with stronger bases such as caustic soda, aqueous ammonia, and so forth.

The hormone itself may be produced from the compositions in a relatively high state of purity by extraction of the alkaloid-follicular hormone product with a suitable organic solvent in the presence of an acid, preferably an aqueous acid solution.

For this purpose the difficultly soluble or insoluble hormone alkaloid combination may be filtered away from the liquid and agitated with an acid, preferably an aqueous solution of hydrochloric acid, but also of another acid such as sulfuric or acetic acid, and with an organic solvent for the hormone, not at all or difficultly miscible with the aqueous acid solution. This operation may be carried out for instance in a separating funnel. As organic solvent we prefer ether, chloroform, carbon tetrachloride, among others.

As a result of such treatment the alkaloid will go into aqueous solution as an alkaloid salt of the acid, while the follicular hormone will go into solution in the organic solvent.

The follicular hormone may be recovered by carefully evaporating the organic solvent, as on a water bath, and the residue consisting of the follicular hormone may be used as such or in solution for therapeutic purposes. A suitable solution is prepared for instance with alcohol about 50%—which solution may be filtered and neutralized,—or with an oil.

Instead of using or dissolving the residue for immediate therapeutic use the evaporated residues from several extractions may also be combined and used for preparing the crystallized follicular hormone.

By repeating the treatment of the urine or other fluids containing the follicular sex hormone with fresh alkaloid base several times the hormone may be obtained almost quantitatively. The alkaloid salt solution which remains may be used again for the treatment of aqueous solutions containing the hormone by addition of stronger bases as above described.

However, even with a single treatment of the urine with the alkaloid, as much as 20 to 80% of the follicular hormone may be recovered by combination with the alkaloid from which combination the follicular hormone may be subsequently liberated.

The following are several illustrative examples of some of the preferred procedures of carrying out the present invention, which are given by way of illustration and not by way of limitation.

*Example I*

100 c. c. of urine during pregnancy containing 1330 m. u. of the follicular hormone per liter were shaken for 24 hours at room temperature with 3 grams of quinine base. The hormone quinine composition was separated from the liquid by filtration and shaken in a separating funnel with aqueous hydrochloric acid and ether. From the solution in the ether the hormone was recovered by carefully evaporating the solvent.

By analysis of the precipitate in one instance, it was found that 25% of the follicular hormone contained in the urine was recovered. When the resultant solution, separated from the precipitate, was again treated with the alkaloid, another 25% of the follicular hormone was recovered and removed.

*Example II*

200 c. c. of an aqueous fluid containing the follicular hormone in a concentration of 3,500 m. u. was shaken with quinine or quinidine base, in the proportion of 1 gram of the alkaloid per 15 grams of the fluid. It is possible to remove 40% of the follicular hormone contained in the original fluid with quinine and 85% with quinidine.

*Example III*

An aqueous fluid containing follicular hormone in the concentration of 5,000 m. u. per liter was shaken with brucine base, 4 grams of the base being employed for every 30 c. c. of fluid. In this manner 60% of the hormone present were obtained from the original fluid.

*Example IV*

200 c. c. of urine during pregnancy, containing 950 m. u. follicular hormone per liter, were shaken for 24 hours at room temperature with 5 grams of theobromine base. 50% of the present follicular hormone can be removed. If the process is repeated, an additional 25% may also be removed.

Although the character of the combination between the alkaloid and/or the follicular hormone, has not been exactly determined, it appears that one or two mols. of the follicular hormone combine with one mol. of the alkaloid base, particularly in the case of structural alkaloid bases such as quinine and quinidine. In the case of an alkaloid base such as brucine and theobromine, it appears that the compounds are formed between one mol. of the brucine or theobromine and one mol. of the follicular hormone. Compounds of this character are produced according to Examples I to IV above. The composition produced according to these examples probably takes the form of a combination of the alkaloid base and the follicular hormone mixed with an excess of alkaloid, or the follicular hormone and the alkaloid instead of being chemically combined, are combined with each other as above, by adsorption.

The combination obtained from the follicle hormone and quinine has the formula $$C_{18}H_{22}O_2. \quad C_{20}H_{24}O_2N_2.$$

The corresponding formulas of the compounds of the follicle hormone with quinidine, brucine and theobromine:

and
and
respectively.

The structural formulas in some instances, such as in the case of brucine, have not been exactly determined, and it is not exactly known as to which of the two reactive nitrogen atoms present in each of the named alkaloid bases, brings about the combination with the follicular hormone. Here we give the structural formula of the follicular hormone and the alkaloid bases as far as they are at present known,—

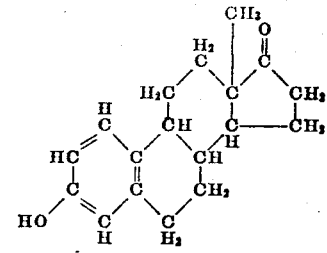
Follicle Hormone

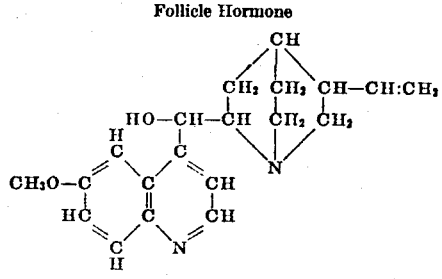
Quinine and Quinidine

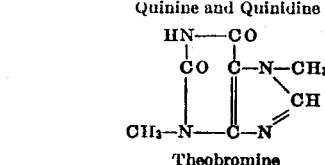
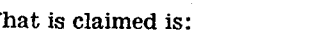
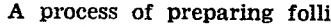
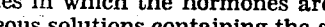
Theobromine

What is claimed is:

1. A process of preparing follicular sex hormones in which the hormones are removed from aqueous solutions containing the same by a treatment with an alkaloid.

2. A process of preparing follicular sex hormones in which the hormones are removed from aqueous solutions containing the same by a treatment with an alkaloid base.

3. A process of preparing follicular sex hormones in which the hormones are removed from aqueous solutions containing the same by a treatment with an alkaloid salt and a base stronger than the base of an alkaloid salt.

4. A process of preparing follicular sex hormones which comprises contacting an aqueous fluid containing the hormones with an alkaloid base, removing the residual fluid from the difficultly soluble combination of the alkaloid base and the hormones and recovering the hormones from said combination.

5. A process of recovering follicular sex hormones, which comprises agitating an aqueous solution containing the hormones with an alkaloid selected from a group of alkaloids consisting of quinine, quinidine, and theobromine.

6. A process of preparing follicular sex hormones, which comprises agitating urine containing the sex hormones with an alkaloid base, which is difficultly soluble in water, for about twenty-four hours at room temperature, removing the residual fluid from the difficultly soluble combination of the alkaloid base and the hormones and recovering the hormones from said combination.

7. A process of preparing follicular sex hormone compositions which comprises agitating an aqueous fluid containing the hormones with an alkaloid base and separating the resultant difficultly soluble combination of the hormones and the alkaloid.

8. A process of preparing follicular sex hormone compositions which comprises agitating an aqueous fluid containing the hormones with quinidine base and separating the resultant difficultly soluble combination of the hormones and the alkaloid.

9. A process of preparing follicular sex hormone compositions which comprises agitating an aqueous fluid containing the hormones with quinine base and separating the resultant difficultly soluble combination of the hormones and the alkaloid.

10. A process of preparing follicular sex hormone compositions which comprises agitating an aqueous fluid containing the hormones with theobromine base and separating the resultant difficultly soluble combination of the hormones and the alkaloid.

11. A process of preparing follicular sex hormone compositions which comprises agitating an aqueous fluid containing the hormones with an alkaloid base, separating the resultant difficultly soluble combination of the hormones and the alkaloid and repeating the process with the residual solution.

12. A process of preparing follicular sex hormones which comprises treating urine containing the sex hormones with quinidine base with agitation for a period of about twenty-four hours at room temperature, separating the difficultly soluble combination of the alkaloid and the hormones, and then extracting the hormones from the combination by treatment with an acid and with an organic solvent.

13. A process of preparing follicular sex hormones which comprises treating urine containing the sex hormones with quinine base with agitation for a period of about twenty-four hours at room temperature, separating the difficultly soluble combination of the alkaloid and the hormones, and extracting the hormones from the combination by treatment with an acid and with an organic solvent.

14. A process of preparing follicular sex hormones which comprises treating urine containing the sex hormones with theobromine base with agitation for a period of about twenty-four hours at room temperature, separating the difficultly soluble combination of the alkaloid and the hormones, and extracting the hormones from the combination by treatment with an acid and with an organic solvent.

15. A follicular sex hormone combination consisting of the hormone combined with an alkaloid base.

16. A follicular sex hormone combination consisting of the sex hormone combined with quinidine.

17. A follicular sex hormone combination consisting of the hormone combined with quinine.

18. A follicular sex hormone combination consisting of the hormone combined with theobromine.

FRITZ JOHANNESSOHN.
ERICH RABALD.